United States Patent [19]

Drewry et al.

[11] Patent Number: 4,540,888
[45] Date of Patent: Sep. 10, 1985

[54] VERTICAL SHAFT ENGINE GENERATOR SET FOR A RECREATIONAL VEHICLE OR THE LIKE

[75] Inventors: Hugh S. Drewry, Plymouth; Ewald Keszthelyi, Campbellsport, both of Wis.

[73] Assignee: Kohler Company, Kohler, Wis.

[21] Appl. No.: 531,509

[22] Filed: Sep. 12, 1983

[51] Int. Cl.³ ............................................. B60R 18/00
[52] U.S. Cl. ................................................. 290/1 R
[58] Field of Search ............... 322/1; 180/65.4, 291, 180/312; 290/1 A, 1 R, 52; 248/639, 646; 123/196 W

[56] References Cited

U.S. PATENT DOCUMENTS

| | | | |
|---|---|---|---|
| D. 151,913 | 11/1948 | Petry | D26/5 |
| D. 203,443 | 1/1966 | Sudmeier | D26/5 |
| 1,501,660 | 7/1924 | Helmer | 62/239 |
| 2,498,973 | 2/1950 | Whiteley | 62/243 |
| 2,543,541 | 2/1951 | Angle | 290/1 |
| 3,037,582 | 6/1962 | Egloff et al. | 123/196 W |
| 3,290,525 | 12/1966 | Sudmeier | 310/153 |
| 3,378,094 | 4/1968 | Myers | 180/291 |
| 3,812,379 | 5/1974 | Kaufman | 290/50 |
| 4,010,377 | 3/1977 | McKenzie | 290/1 R |
| 4,122,353 | 10/1978 | Noguchi | 290/1 A |

Primary Examiner—William M. Shoop, Jr.
Assistant Examiner—W. E. Duncanson, Jr.
Attorney, Agent, or Firm—Barry E. Sammons

[57] ABSTRACT

An improved engine generator set, especially adapted for a recreational vehicle or the like, includes a mounting tray dimensioned to be received through a recess in the floor board of the vehicle for mounting to the vehicle frame members. The mounting tray supports an engine whose drive shaft extends vertically downwardly through the mounting tray for mating with the shaft of a generator which is positioned directly underneath the engine so as to extend beneath the vehicle. In this way the overall floor space occupied by the generator set is reduced.

12 Claims, 7 Drawing Figures

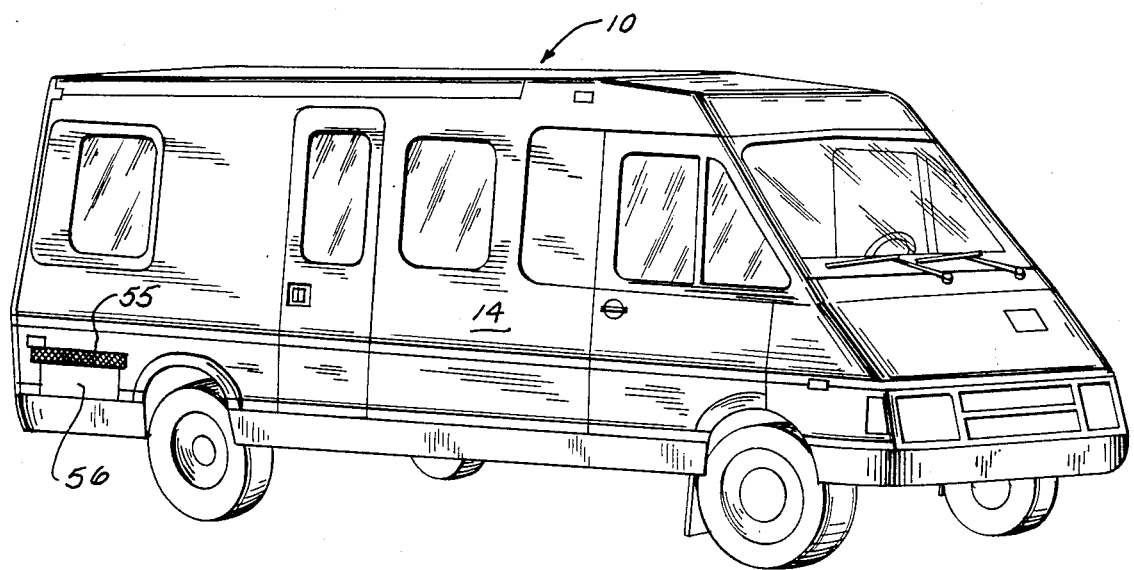
Fig.1
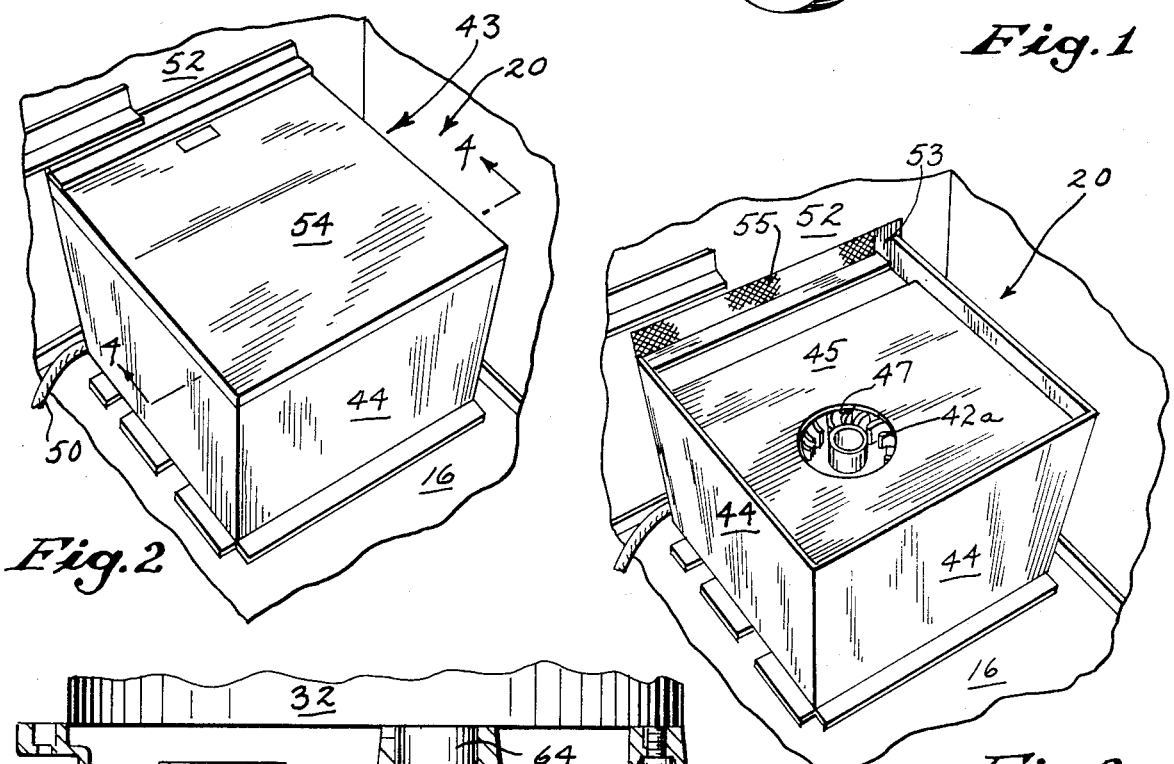
Fig.2
Fig.3
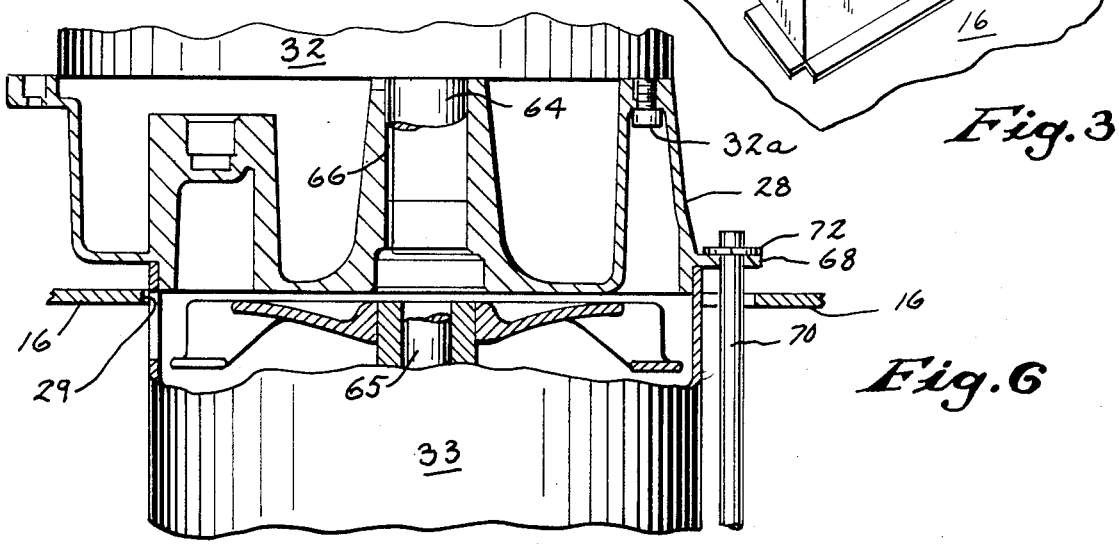
Fig.6

4,540,888

VERTICAL SHAFT ENGINE GENERATOR SET FOR A RECREATIONAL VEHICLE OR THE LIKE

BACKGROUND OF THE INVENTION

This invention relates generally to engine generator sets and more specifically, to a engine generator set especially designed for installation in a recreational vehicle.

The desire of travelers to utilize their vehicle not only for transportation purposes but for living quarters as well has led to the development of recreational vehicles, such as motor homes and travel trailers. Present day recreational vehicles now offer practically all the amenities of home living including electric lights, climate control, running hot and cold water, as well as cooking facilities. The power necessary to run the electric lights, the climate control system, the water pump which pumps the running water and other electric appliances within the recreational vehicle can be derived from either the recreational vehicle engine in the case of a motor home, or from a separate power source such as a battery or motor generator set. A battery is only satisfactory if the appliance power load of the recreational vehicle is very light. Otherwise, it is desirable to employ a engine generator set to power the recreational vehicle appliances.

Present day recreational vehicle engine generators include a horizontal shaft internal combustion engine, either gas or diesel, which drives a horizontal shaft generator. The internal combustion engine and generator are usually mounted within the recreational vehicle on the recreational vehicle floor board. Usually, although not necessarily, the engine generator set is mounted near the rear of the vehicle. For the most part, present day horizontal shaft recreational vehicle engine generator sets have proven satisfactory. However, such present day horizontal shaft engine generator sets may occupy a considerable portion of the total recreational vehicle floor space which is generally not desirable. In addition, mounting of present day engine generator sets on the vehicle floor board usually entails a time consuming installation process, not to mention the difficulty associated with initially positioning the generator set within the vehicle interior.

In contrast to the present day horizontal shaft recreational vehicle engine generator sets, the present invention relates to a vertical shaft recreational vehicle engine generator set which is not believed subject to the above-enumerated disadvantages associated with present day horizontal shaft recreational vehicle engine generator sets.

BRIEF SUMMARY OF THE INVENTION

Briefly, in accordance with the preferred embodiment of the invention, there is provided a vertical shaft engine generator set especially designed for installation in a recreational vehicle or the like. The vertical shaft engine generator set of the present invention includes a vertical shaft engine, typically an internal combustion engine, which is mounted on top of an oil sump which itself is resiliently attached to a support to overlie an opening through the support. The support takes the form of a mounting tray having a depending skirt dimensioned to be received through a passage in the floor of the recreational vehicle for mounting to the cross frame members of the vehicle chassis thereby simplifying installation. A vertical shaft generator is mounted beneath the oil sump so as to extend downwardly through the vehicle floor opening between the cross frame members of the vehicle chassis. The shaft of the generator is mated with the vertically depending driving shaft of the engine so that the generator is driven thereby to generate electrical power.

Accordingly, it is an object of the present invention to provide a vertical shaft engine generator which is especially well suited for use in a recreational vehicle. The mounting of the generator of the engine generator set beneath the engine reduces the area occupied by the engine generator set since the generator itself extends beneath the recreational vehicle floor within the same area occupied by the engine itself. Also, vibration is reduced by such mounting of the generator and the engine.

It is another object of the present invention to provide a vertical shaft engine generator set which may be easily installed within a recreational vehicle or the like. The mounting tray, which carries the engine on its top side may be inserted through the passage in the recreational vehicle floor board from the bottom of the vehicle which greatly simplifies installation.

It is yet another object of the present invention to provide a vertical shaft recreational vehicle engine generator set which does not require mounting adjacent to the outside walls of the vehicle. Locating the generator of the engine generator set beneath the floor board of the recreational vehicle enables the generator to be cooled by outside air so that cooling air from the generator is not discharged within the vehicle. Moreover, the engine exhaust is discharged through an exhaust pipe extending through the mounting tray to the exterior of the vehicle avoiding the need to locate the generator set adjacent to a vehicle wall.

Yet another object of the present invention is to provide a vertical shaft engine generator set having improved engine cooling. An air shroud is provided about the engine for ducting air into the air intake and for ducting cooling air past the engine.

Other objects and advantages of the present invention will become readily apparent upon reading of the foregoing specification and claims.

BRIEF SUMMARY OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a perspective view of a recreational vehicle which incorporates the engine generator set of the present invention;

FIG. 2 is a perspective view of a portion of the interior of the recreational vehicle of FIG. 1 illustrating the engine generator set of the present invention with the lid of the motor outer shell attached;

FIG. 3 is a perspective view of a portion of the interior of the vehicle of FIG. 1 showing the engine generator set of the present invention with the lid of the engine generator set outer shell removed;

FIG. 6 is a partial cut-away view of a portion of the engine generator set of FIG. 4 illustrating the details of the special coupling interposed between the engine block of the engine and the generator.

DETAILED DESCRIPTION OF THE PREFERRED EMBODIMENT

Figure 4:
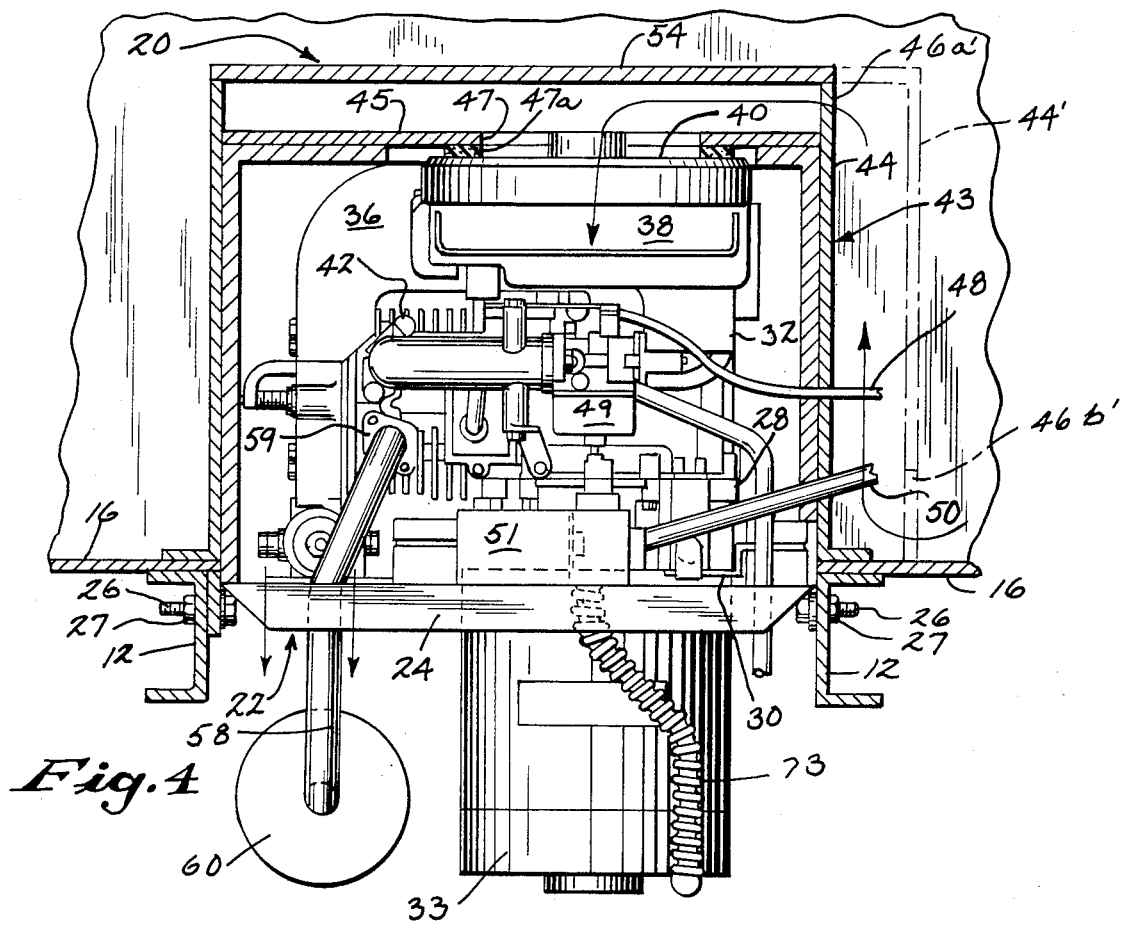
FIG. 4 is a cross sectional view taken along lines 2—2 of FIG. 2 illustrating the details of the engine generator set of the present invention.

FIG. 1 illustrates a recreational vehicle 10 which is depicted as a self-propelled motor home although it should be understood that the engine-generator set of the present invention (described hereinafter) may be utilized in other types of recreational vehicles such as travel trailers or the like. Motor home 10 is conventional in its construction and as illustrated on FIG. 5 includes a frame or chassis 11 having spaced apart cross members 12. Referring back to FIG. 1 the vehicle chassis supports a vehicle shell 14 whose interior is generally divided into living quarters and a driver compartment.

The overall construction of recreational vehicle 10 is not important to the understanding of the present invention. It is sufficient to understand however, that vehicle 10 includes a floor 16 which, as illustrated in FIG. 4, is supported by the cross members 12 of the vehicle chassis.

To power the various appliances within the vehicle (not shown) such as a refrigerator, water pump, lights, a television set and the like, there is provided an improved vertical shaft engine generator set 20 (best illustrated in FIGS. 2, 3, 4 and 5) which, as will be better understood hereinafter, is mounted through the floor 16 of the recreational vehicle 10 so as to reduce the amount of floor space occupied in comparison with conventional horizontal shaft recreational vehicle generators. The details of the engine generator set 20 of the present invention are illustrated in FIG. 4. Basically, the engine generator set 20 of the present invention includes a mounting tray 22 which supports an engine 32 above the tray and a generator 33 which is disposed below the tray 22 so that the tray 22 serves to separate the engine and generator. Referring to FIG. 4, the generator set 20 is typically mounted to the vehicle chassis and to this end, the mounting tray 22 of the generator set 20 is provided with a depending skirt 24. The dimensions of the mounting tray are slightly less than an opening in the vehicle floor 16 which is bounded by the cross members 12 and vehicle chassis 11 to allow the mounting tray 22 to be received in the opening and be secured to the cross members 12 of the frame by bolts 26 which extend through the skirt 24 and the cross members 12. A nut 27 is threaded onto each mounting bolt to make the bolt fast to the cross member. The skirt may also be fastened to the chassis 11 in a similar manner. The particular manner in which the tray 22 is secured to the chassis is only exemplary. It will be appreciated by those skilled in the art that variations in the chassis construction of the vehicle may necessitate variations in the manner in which the tray is mounted to the vehicle chassis from that described.

Still referring to FIG. 4, the engine-generator set 20 of the present invention includes an oil sump 28 which is positioned over an opening 29 in the mounting tray as illustrated in FIG. 6. The oil sump 28 has mounting ears 30 extending radially therefrom (as best illustrated in FIG. 4) and shock mounts 31 resiliently attach the ears 30 of the oil sump 28 to the tray 22 as best illustrated in FIG. 6. The engine 32 is mounted on the top of the oil sump 28 above the tray 22 by way of bolts 32a (FIG. 6). Thus, the oil sump 28 not only serves to maintain a reservoir of oil for the engine, but further serves to secure the engine to the tray. The generator 33 is mounted to the bottom of the oil sump 28 beneath the tray so as to extend below the floor 16, as best illustrated in FIG. 6. As can now be appreciated, the resilient mounting of the oil sump 28 to the tray 22 by way of shock mounts 31 serves to reduce the engine and generator vibration that is transmitted to the frame 11 and the cross members 12.

The engine 32 of FIG. 4 is typically an internal combustion engine and, in the presently preferred embodiment, takes the form of a Tecumseh Model TVM 140 gasoline engine manufactured by Lawson Engine Division, Tecumseh Products Company, New Holstein, Wis. While engine 32 is, for the most part, conventional in its construction and operation, the engine 32 differs from other typical gasoline internal combustion engines in that the engine 32 is provided with an air intake shroud 36 which is fastened to the engine in communication with the inlet into the engine air cleaner 38. An opening 40 is provided into the top of the air intake shroud 36 so that air is ducted by the air intake shroud into the air cleaner 38. The air intake shroud is also in communication with the engine manifold 42 so that the cooling air is ducted by the air intake shroud 36 past the engine manifold 42 and outside the vehicle to provide engine cooling.

Figure 5:
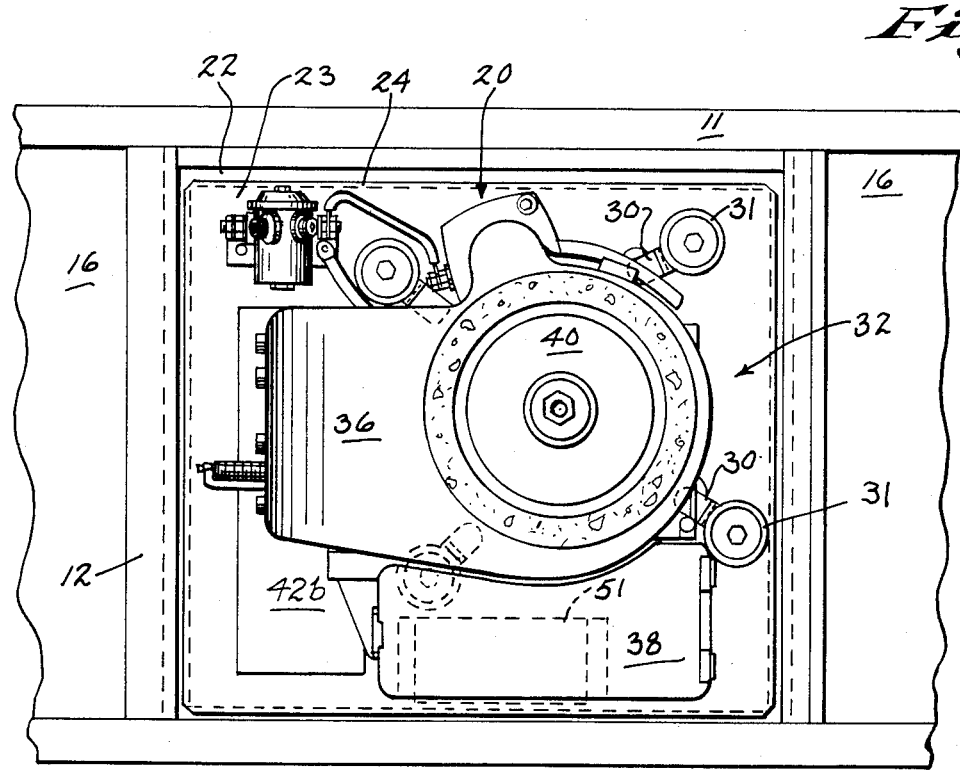
FIG. 5 is a plan view of the generator set of FIG. 4.
Figure 5A:
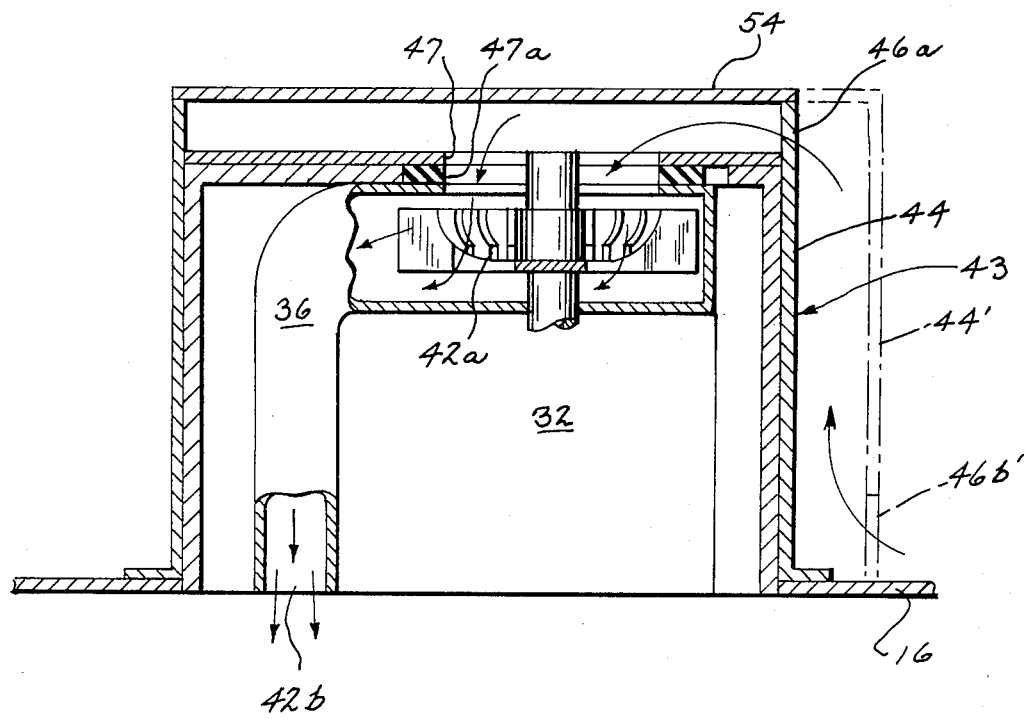
FIG. 5a is a schematic view of the engine of the generator set of FIG. 4 showing the path of cooling air therethrough.

As best illustrated in FIG. 5a, the engine 32 is provided with a fan 42a which is driven by the engine. The fan 42a, when driven by the engine 32, sucks air into the shroud 36 through the opening 40 in the top of the shroud. An air exhaust opening 42b is provided in the tray 22 as best illustrated in FIGS. 5 and 5a so that when the engine 32 is enclosed within a housing (described with respect to FIGS. 2, 3 and 4), the air entering the shroud via opening 40 is drawn by the fan through the shroud 36 and is exhausted through the opening 42b in tray 22 as best illustrated in FIG. 5a. While the air flow to the shroud 36 is typically vertically downwardly as indicated by the air flow arrows in FIG. 5a, it might be desirable in certain circumstances to duct the air upwardly from openings in the bottom of the tray and out to the top of shroud 36 so that the air is forced upwardly through a stove pipe in communication with the shroud opening 40 (not shown) and through the roof of the recreational vehicle.

Referring now to FIGS. 2 and 3 to shield the recreational vehicle occupants from the heat and noise of the engine 32, the engine is typically enclosed within a housing 43 which takes the form of a shell having side walls 44, an opposing pair of which are secured to each of cross members 12, and a top wall 45 which is typically recessed below the level of the side walls for reasons which will become clear hereinafter. Since engine 32 is typically air cooled, an air passage 47 is provided through the top wall 45 of the housing 43 in communication with the opening 40 in the top of the air intake shroud 36 (FIG. 4) of the engine 32 so as to permit air to enter the housing 43 and pass into the engine air intake shroud 36 for engine operation and engine cooling. An annular foam seal 47a (FIG. 4) is typically provided to seal the openings between the top wall 45 and the periphery of the opening 40 in the shroud 36 so that there is little air leakage into the interior of the housing as the engine fan 42a (FIG. 3) draws air past the heated engine components and out of the interior of the housing through openings 42b in the tray. In practice, it is desirable that the housing 43 fit tightly about the engine 32. With the housing dimensioned so as to tightly fit about the engine, the engine fan 42a readily forces the hot air out of the housing 43 through the opening 42b in the tray 22. Were the housing 43 made large so as to loosely fit about the engine 32, then the engine fan 42a would not be as effective to force the heated air from the housing.

In addition to the top opening 47 in the housing 43, the housing 43 also includes smaller side openings, as illustrated in FIG. 4 to permit a choke cable 48 to extend therethrough for connection to the choke plate on the engine carburetor 49. Typically, although not necessarily, an electrical conduit 50 also extends through housing 43 for connection to a junction box 51. Rather than pass through the housing 43, the conduit 50 may pass through the mounting tray 22 instead. As will become better understood hereinafter, the junction box 51 facilitates an electrical connection between the generator (described hereinafter) and the electrical conductors (not shown) carried within the conduit 50.

Referring now to FIGS. 2 and 3, the generator set 20 of the present invention is mounted through an opening in the floor 16 inside the vehicle shell so that the generator set is typically although not necessarily juxtaposed to the inside surface one of the two walls 52 of the vehicle shell. To facilitate passage of outside air into the top opening 47 of the housing 43, an air intake passageway 53 (FIG. 3) is provided through the vehicle wall 52 slightly above the level of the top wall 45 of the shell 43. The height of the opening 53 is approximately equal to the distance which the side walls 44 of the housing extend beyond the upper surface of the top wall 45 so that a cover 54 (FIG. 2) may be placed upon the top edge of the walls 44, to form a plenum which directs the air from the inlet 53 into the opening 47 in the top wall 45 of the housing 43. Referring to FIG. 3, a screen 55 overlies the opening 53 to prevent the passage of foreign objects, such as insects, through the air intake. Although both the cover 54 and the top wall 45 of housing 43 are shown as being detachable with side walls 44, from a manufacturing standpoint, it is desirable that cover 54 be integral with the side walls 44 and the top wall 45 would either be detachably connected or integral with the housing side walls 44.

Referring back to FIGS. 2 and 3, the housing 43 is formed of three side walls so that the open end of the housing 43 abuts the wall 52. This allows for an access opening through the wall 52 to the engine, the access opening being sealed by way of a removable plate 56 which is illustrated in FIG. 1.

Although the generator set has been described as being mounted adjacent to the walls 52 of the vehicle, those skilled in the art may appreciate that the generator set 20 could easily be mounted through the vehicle floor 16 at a location spaced inwardly from the side walls so long as the cooling air is ducted into the housing 43.

Referring to FIG. 4, an exhaust pipe 58 is connected at one end to the exhaust port 59 of the engine 32 and extends through an opening in tray 22 so that the opposite end of the exhaust pipe is connected to a muffler 60 which is typically secured to the vehicle chassis in a conventional manner. In this way, the exhaust gasses of engine 32 are carried outside of the interior of the vehicle to prevent air contamination.

As best illustrated in FIG. 6, which is a cut-away view of a portion of the oil sump 28, the generator 33 of the motor generator set 20 extends upwardly through the opening 29 in the mounting tray 22 beneath the engine 32 so that the engine shaft 64 is coaxial to, for mating with the generator drive shaft 65. Mounting of the generator 33 underneath the engine 32 is facilitated by the oil sump 28 and, to this end, the oil sump 28, as illustrated in FIG. 6, is provided with a centrally disposed upwardly extending hollow socket 66 whose inner radius is dimensioned to receive both the engine shaft 64 and the generator shaft 65 to permit the shafts to mate so that power is transmitted from the engine shaft to the generator shaft. In addition to each of the mounting ears 30 of FIG. 5 which extend radially outwardly from the oil sump 28, the oil sump 28 also is provided with a plurality of radially extending ears 68 offset from its base (only one of which is shown in FIG. 6). Each ear 68 has a passage therethrough to receive the threaded end of a mounting bolt 70 whose opposite end bears against a mounting tab (not shown) on the generator. A nut 72 is threaded to the upper end of mounting bolt 70 to make the bolt fast to the oil sump 28. As can now be appreciated, the oil sump 28 thus serves to mount the engine 32 to the generator 33 as well as to support both the engine 32 and generator 33 from the tray 22.

Referring to FIG. 4, in practice, generator 33 typically takes the form of a rotating field 2.5 kw generator manufactured by Kohler Company, Kohler, Wis. With this particular model generator, the electrical connecting terminals (not shown) are located at the end of the generator opposite the oil sump 28. An armored electrical cable 73 is provided to carry the generator current to junction box 51 on tray 22. It should be understood that other types of generators of either nonregulated or regulated design could be employed.

From the foregoing description of the engine generator set 20 of the present invention, it may be appreciated that the mounting of the generator 33 underneath the engine 32, so that the generator 33 extends through the floor board opening and beneath the vehicle, greatly reduces the floor space occupied by the engine generator set in comparison with a conventional horizontal shaft engine generator set. This is very advantageous since, as previous indicated, the overall vehicle floor space is relatively limited. In addition, the particular construction of the engine generator set and specifically the mounting of the engine 32 to the oil sump 28 mounted to the mounting tray 22 and the mounting of generator 33 to the oil sump 28, permits the engine generator set to be mounted from underneath the vehicle so as to reduce the installation costs.

Although the generator set 20 has thus far been described as being mounted within a self-propelled motor home 10, the generator set 20 may also be utilized with travel trailers or may even be utilized in other, non-vehicle applications. Referring to FIG. 4, to facilitate air flow into housing 43 when the generator set is utilized in such instances, the housing 43 is provided with an outer wall 44' (shown in phantom) joined to the cover 54 so as to be parallel with, but spaced apart from one of the housing side walls 44, thereby creating an air plenum between the wall 44' and 44. An opening 46a' (shown in phantom) is provided through the wall 44' near its base and an opening 46b' is provided through the side wall 44 between cover 54 and top wall 45 so that air may be ducted through the plenum created by walls 44 and 44' and through the plenum created by cover 54 and top wall 45 and into the opening 40 in the shroud 36 so as to be drawn by the engine fan through the air shroud 36 and out of the housing through opening 42b in tray 22. By locating openings 46a' and 46b' at the base and top of side walls 44' and 44, respectively, the incoming air undergoes three 90° bends which tends to reduce the engine noise.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. A vertical shaft engine generator set installed through a passageway in the floor of a recreational vehicle and mounted to the vehicle or the like comprising:
   an engine having a vertically depending drive shaft;
   a support member dimensioned to be received through said floor passageway, for mounting to the vehicle said support member mounting said engine; and
   a generator disposed below the level of the floor and mounted underneath said engine, said generator having an upwardly extending shaft for mating with said depending engine drive shaft so that said generator shaft is driven thereby.

2. The invention according to claim 1 further including a housing for surrounding said engine.

3. The invention according to claim 1 wherein said support comprises a mounting tray having depending skirt, the skirt being secured to the vehicle beneath the vehicle floor.

4. The invention according to claim 1 wherein said engine includes a sump for mounting said engine to said support member and for mounting said generator to said engine.

5. The invention according to claim 4 further including shock mounts for securing said engine sump to said support member.

6. The invention according to claim 1 wherein said engine is an internal combustion gasoline engine.

7. A generator set for a recreational vehicle or the like installed in the vehicle through an opening in the vehicle floor board and mounted to the vehicle comprising:
   a tray which is dimensioned to be received in an opening in the vehicle floor board and said tray including mounting means for mounting said tray to the vehicle;
   an engine disposed above the tray and having a downward extending drive shaft;
   a generator disposed beneath the tray underneath the engine, said generator having an upwardly extending drive shaft for mating with said downwardly depending engine shaft;
   mounting means for securing said engine to said generator; and
   shock absorbing means connected to said mounting means and to said tray for mounting said mounting means to said tray.

8. The invention according to claim 7 further including a shell formed by side walls and a top, the shell being connected to the vehicle to form a tightly fitting compartment above said tray.

9. The invention according to claim 8 further including a lid extending across the upper edges of said side walls and above the level of said top to form a plenum between said top and said lid and further including a first air intake passageway formed in the top and in communication with said engine, a seal between said engine and said top to reduce air leakage into said compartment and a second air intake passageway formed through the vehicle and into communication with said plenum to enable air to pass through said plenum from outside the vehicle.

10. The invention according to claim 9 wherein one of said side walls is common with a vehicle wall and wherein said second air intake passageway is formed through the common wall.

11. A vertical shaft engine generator set comprising:
    a mounting tray;
    an engine disposed above said tray and having a downwardly extending drive shaft;
    a generator disposed beneath said tray underneath said engine, said generator having an upwardly extending drive shaft for mating with the downwardly depending shaft of said engine;
    mounting means for mounting said engine to said generator and said tray; and
    a shell having opposing side walls and a top for surrounding said engine to form a compartment above said tray, said shell having an opening for admitting air into said engine.

12. The invention according to claim 11 wherein said engine generator set further includes plenum means for ducting air into said shell for admission into said engine, said plenum means including:
    a cover overlying the top wall of said shell so as to be spaced apart therefrom to create a first passageway therebetween in registration with the opening into said shell;
    an outer wall parallel to and spaced apart from one of said opposing walls of said shell to create a second passageway therebetween in communication with said air passageway between said cover and said shell top wall;
    a first air intake through said outer wall in registration with said first air passageway; and
    a second air intake through one of said opposing side walls of said shell so as to be in registration with said second air passageway for carrying air from said first air passageway into said second air passageway so that air may be admitted into said engine.

* * * * *